(12) United States Patent
Asakura (10) Patent No.: US 6,993,369 B2
(45) Date of Patent: Jan. 31, 2006

(54) PORTABLE ELECTRONIC EQUIPMENT AND CHARGER FOR PORTABLE ELECTRONIC EQUIPMENT

(75) Inventor: Hiroaki Asakura, Hamura (JP)

(73) Assignee: Kabushiki Kaisha Toshiba, (JP)

( * ) Notice: Subject to any disclaimer, the term of this patent is extended or adjusted under 35 U.S.C. 154(b) by 343 days.

(21) Appl. No.: 10/346,161

(22) Filed: Jan. 17, 2003

(65) Prior Publication Data
US 2003/0148798 A1    Aug. 7, 2003

(30) Foreign Application Priority Data
Jan. 17, 2002   (JP) .............................. 2002-008735

(51) Int. Cl.
*H04M 1/00* (2006.01)

(52) U.S. Cl. ................... 455/573; 455/575.1; 379/446; 379/455

(58) Field of Classification Search ................ 455/573, 455/575.1, 550, 90, 566; 320/108; 363/146; 379/446, 454, 455

See application file for complete search history.

(56) References Cited

U.S. PATENT DOCUMENTS

| | | | |
|---|---|---|---|
| 6,073,033 A * | 6/2000 | Campo | 455/566 |
| 6,084,379 A * | 7/2000 | Buniatyan | 320/101 |
| 2001/0044281 A1 * | 11/2001 | Peterzell et al. | 455/90 |
| 2002/0085403 A1 * | 7/2002 | Cho | 363/146 |
| 2004/0145343 A1 * | 7/2004 | Naskali et al. | 320/108 |

* cited by examiner

Primary Examiner—Sonny Trinh
Assistant Examiner—Phuoc Doan
(74) Attorney, Agent, or Firm—Banner & Witcoff, Ltd.

(57) ABSTRACT

Portable electronic equipment and a charger for portable electronic equipment allowing portable electronic equipment placed in the charger to be compact as small as possible and easy removal of the portable electronic equipment from the charger. The portable electronic equipment has engagement recesses formed on side portions of the equipment housing at positions separated from other end of the equipment housing in such a way that, when the other end of the equipment housing is pushed down in a state, it is placed in and held by the charger, one end of the equipment housing is pivoted about the engagement projections, moving upward and producing a moment sufficient to disengage the engagement of the engagement latch from the engagement hole. The charger has engagement projections formed at positions where they engage with the engagement recesses which are formed on of the portable electronic equipment.

3 Claims, 12 Drawing Sheets

PORTABLE ELECTRONIC EQUIPMENT AND CHARGER FOR PORTABLE ELECTRONIC EQUIPMENT

CROSS-REFERENCE TO RELATED APPLICATIONS

This application is based upon and claims the benefit of priority from the prior Japanese Patent Application No. 2002-8735 filed on Jan. 17, 2002; the entire contents of which are incorporated herein by reference.

BACKGROUND OF THE INVENTION

1. Field of the Invention

The present invention relates to rechargeable portable electronic equipment and a charger for charging the portable electronic equipment.

2. Description of the Related Art

Figure 8:
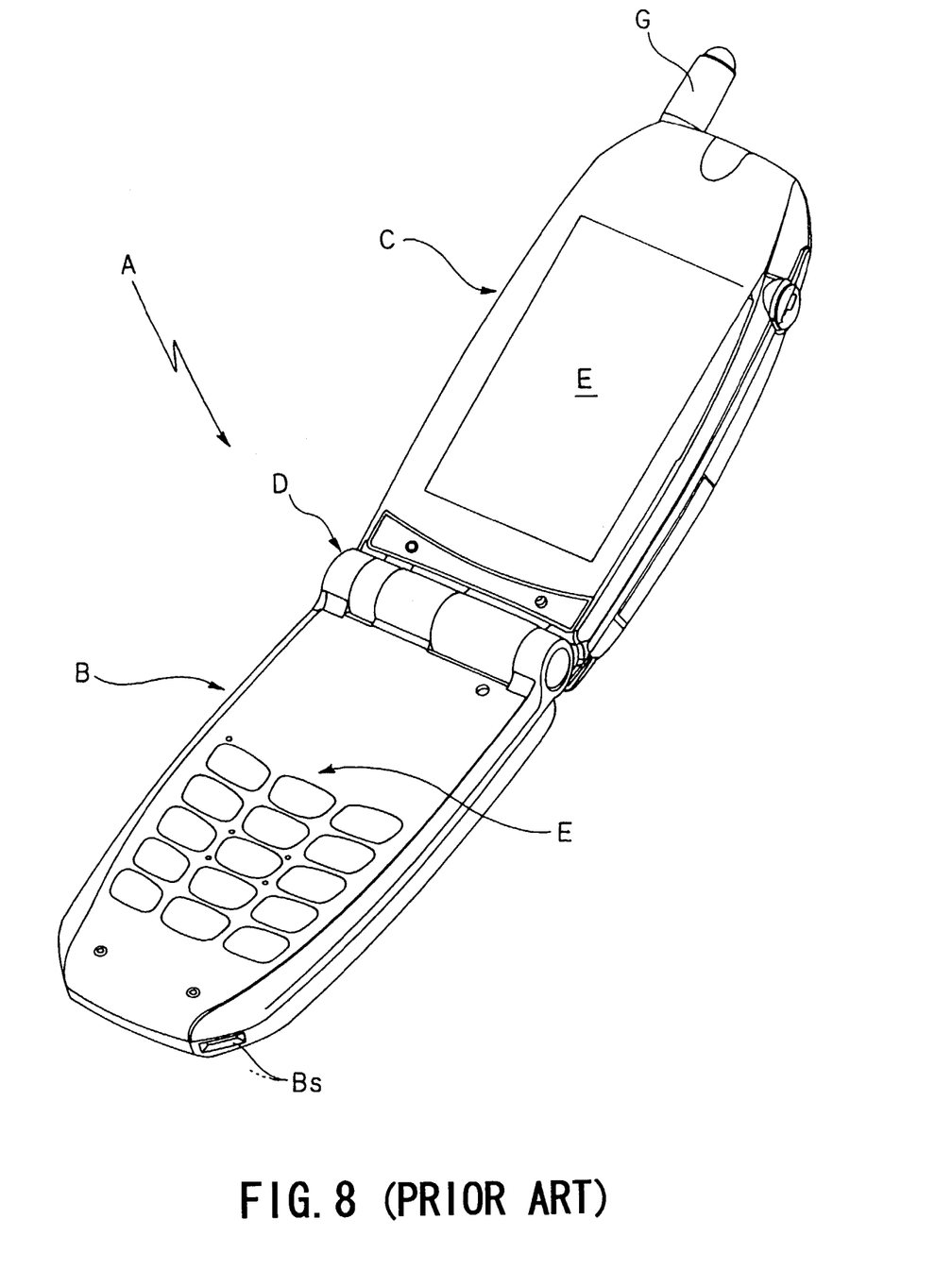
FIG. 8 is an outside perspective view showing conventional portable electronic equipment.
Figure 9A:
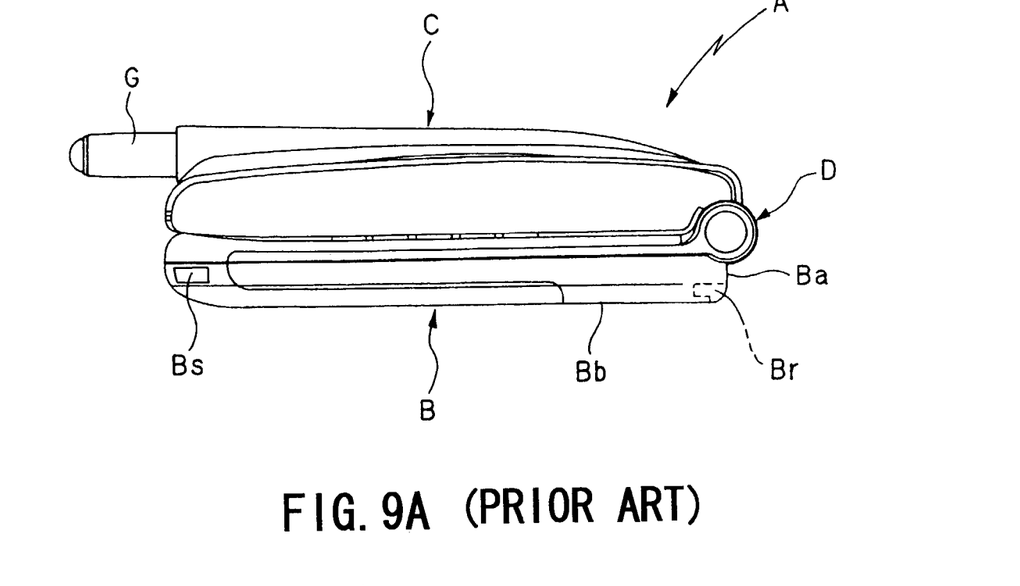
FIG. 9A and FIG. 9B are a side view and a bottom view of the conventional portable electronic equipment.
Figure 9B:
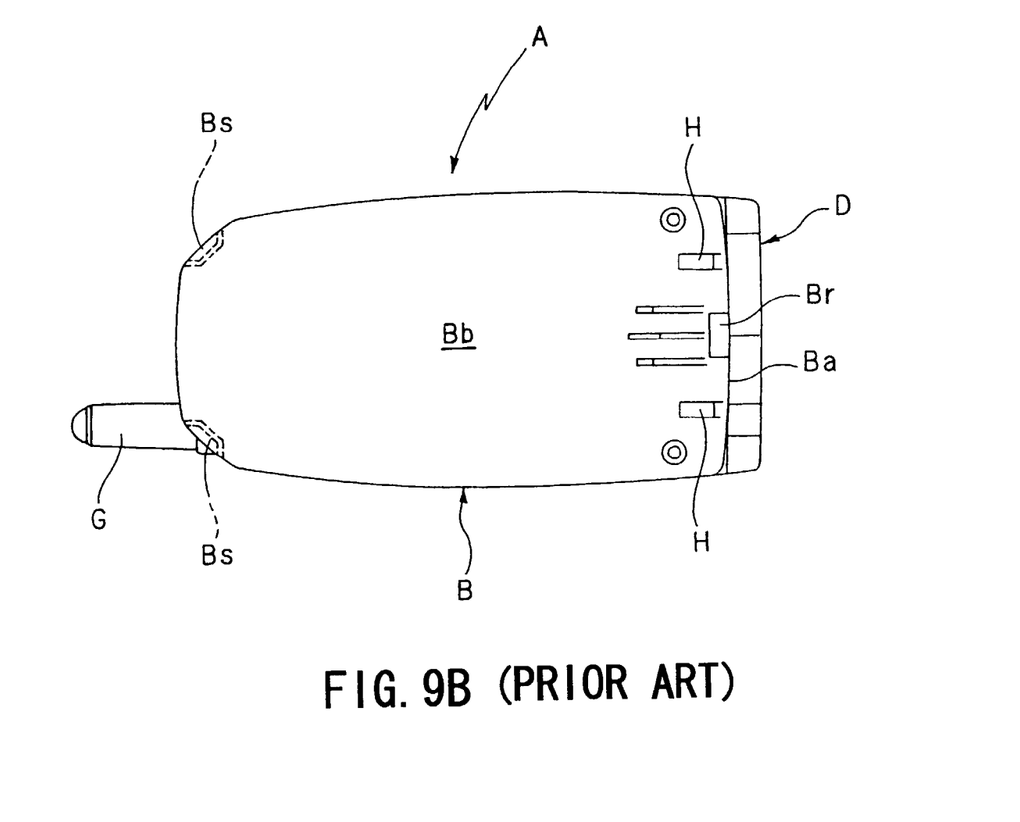

A folding portable phone A which is one type of portable electronic equipment as shown in FIG. 8 and FIGS. 9A and 9B has a lid side housing C freely openably connected to a body side housing B via a hinge D, the body side housing B is provided with a key pad section E and the like on its front (top face), and the lid side housing C is provided with a display section F, an antenna G and the like. And it is operated by a rechargeable secondary battery (not shown) mounted in the body side housing B.

The body side housing B of the portable phone A is provided with an engagement hole Br at its back end (one end) Ba for engagement with an engagement latch of a charger to be described later, engagement recesses Bs for engagement with engagement projections of the charger to be described later formed at right and left corners of the front, and a pair of right and left charging terminal blocks H, H disposed on a bottom board Bb.

Figure 10:
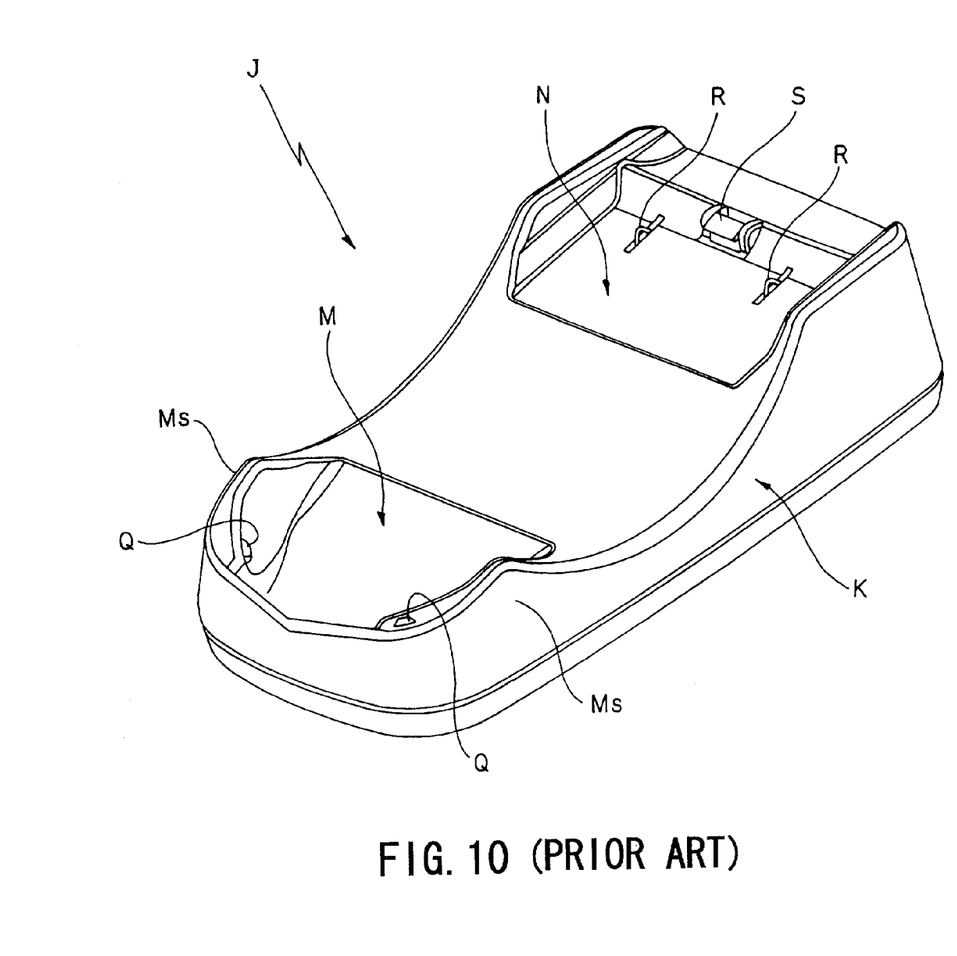
FIG. 10 is an outside perspective view showing a charger for the conventional portable electronic equipment.

FIG. 10 shows a charger J used to charge the above-described portable phone A. A housing K of this charger J is formed to have a front cradle M and a rear cradle N on which the portable phone A is placed.

Engagement projections Q for engagement with the engagement recesses Bs of the portable phone A are formed on right and left side walls Ms, Ms of the front cradle M. And, a pair of right and left charging terminals R, R which are contacted with the charging terminal blocks H, H of the portable phone A are formed on the rear cradle N, and an engagement latch S for engagement with the engagement hole Br of the portable phone A is also disposed on the rear cradle N.

Figure 11:
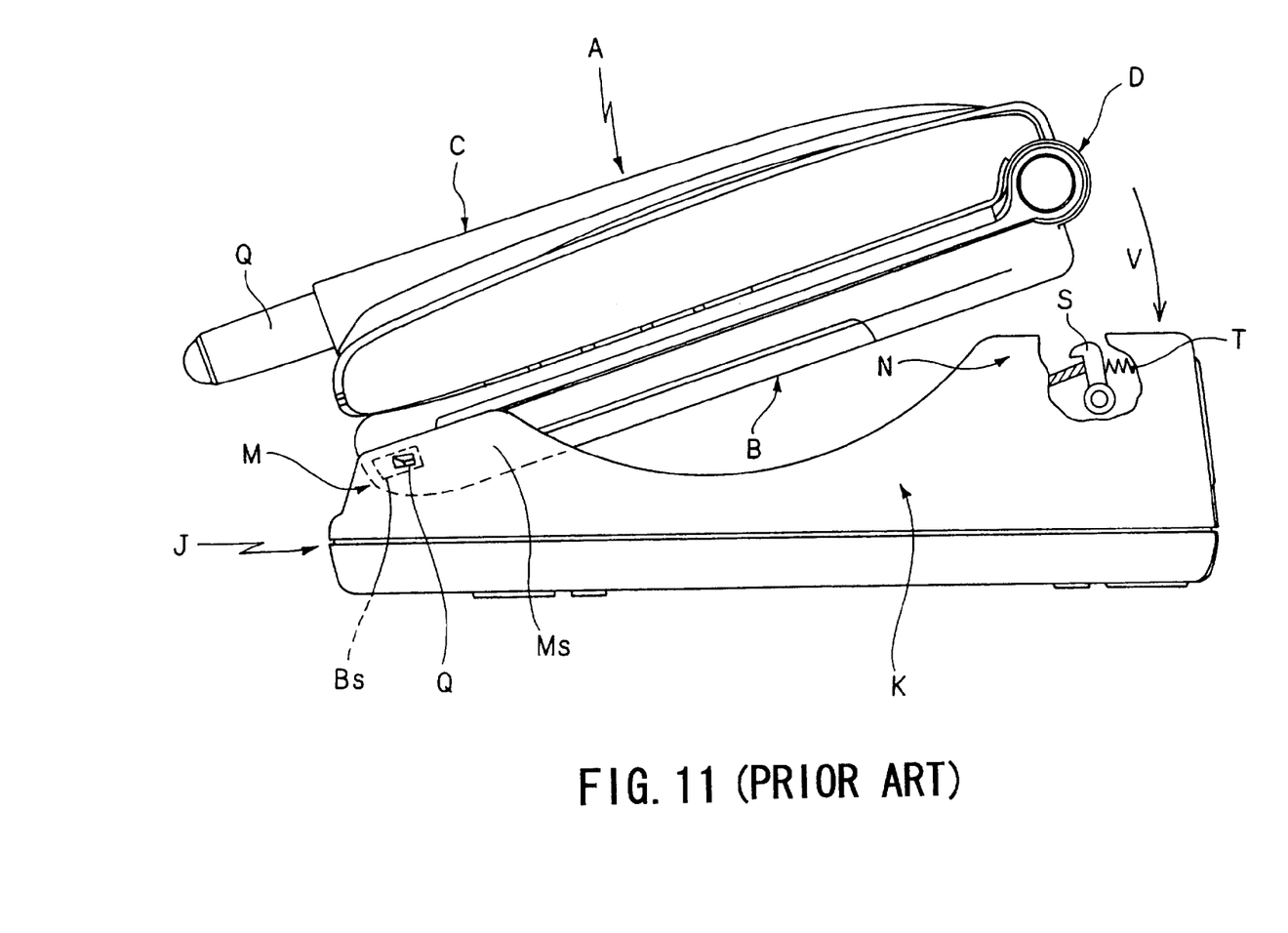
FIG. 11 is a side view showing a state that the conventional portable electronic equipment is placed in the conventional charger or taken from the conventional charger.
Figure 12:
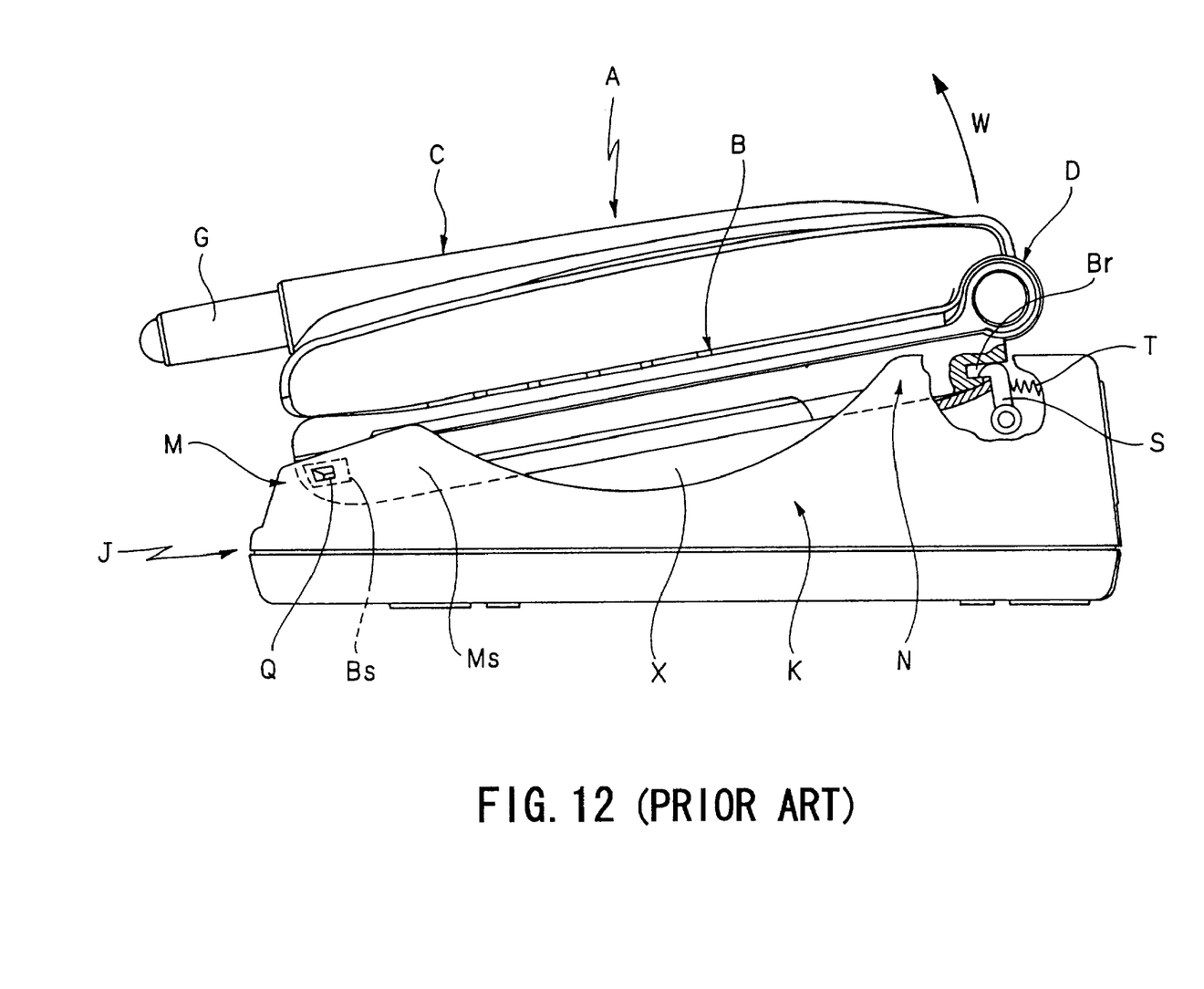
FIG. 12 is a side view showing a state that the conventional portable electronic equipment is placed in the conventional charger.

The engagement latch S is disposed to be freely movable in engagement and disengagement directions of the engagement hole Br of the portable phone A, specifically in such a way to appear and disappear with respect to the rear cradle N, and kept pushed by a spring T in a direction (to the left in the drawing) to protrude to the rear cradle N as shown in FIG. 11 and FIG. 12.

To fit the portable phone A on the charger J for recharging, the engagement recesses Bs of the portable phone A are first engaged with the engagement projections Q of the charger J as shown in FIG. 11.

Then, the rear (the right side in the drawing) of the portable phone A is pushed down as indicated by arrow V against the pushing force of the spring T to place on the rear cradle N by pushing away the engagement latch S. Thus, the engagement hole Br of the portable phone A is engaged with the engagement latch S as shown in FIG. 12.

By mutually engaging the engagement recesses Bs and the engagement projections Q and the engagement hole Br and the engagement latch S as described above, the portable phone A is held in position of the charger J, and the charging terminal blocks H, H of the portable phone A (see FIGS. 9A, 9B) are forced to be securely contacted with the charging terminals R, R of the charger J.

Meanwhile, to remove the portable phone A which is held as shown in FIG. 12 from the charger J, the rear (the night side in the drawing) of the portable phone A is first pulled up as indicated by arrow W while pushing away the engagement latch S against the pushing force of the sprint T to release the engagement of the engagement hole Br of the portable phone A with the engagement latch S as shown in FIG. 11.

Then, the portable phone A is pulled out from the charger J to disengage the engagement recesses Bs from the engagement projections Q. Thus, the portable phone A is removed from the charger J.

To remove the portable phone A which is held on the charger J in the above-described charging system of the portable electronic equipment which consists of a combination of the portable phone A and the charger J, it is necessary to pull up the rear part of the portable phone A as if it is peeled from the charger J to disengage the engagement latch S which is pushed by the spring T from the engagement hole Br.

Therefore, a relatively large space X (in which fingers can be inserted) is provided between the portable phone A and the charger J to allow the user to insert fingers to apply a force to the portable electronic equipment A as shown in FIG. 12. But, this space X causes a disadvantage that the system as a whole with the portable electronic equipment A placed in the charger J has an unexpectedly large size.

To remove the portable phone A from the charger J, it is necessary to insert fingers into the space X to pull up the portable phone A while pushing the charger J against the surface of a desk or the like on which the charger J is placed so that the charger J is not separated from the placed surface when the portable phone A is removed. Therefore, the removal of the portable phone A from the charger J is not necessarily satisfactory.

In view of the above-described circumstances, the present invention is to provide portable electronic equipment which enables to make a system as a whole with the portable electronic equipment placed in a charger as small as possible and also to easily remove the portable electronic equipment from the charger, and to provide a charger for the portable electronic equipment.

SUMMARY OF THE INVENTION

An aspect of the present invention is portable electronic equipment which has an engagement hole to be engaged with and disengaged from an engagement latch of a charger at one end of an equipment housing and has engagement recesses in the equipment housing for engagement with engagement projections of the charger, and which is charged by the charger in a state that the portable electronic equipment is held by the charger with the engagement latch engaged with the engagement hole and the engagement projections engaged with the engagement recesses, wherein: the engagement recesses are formed on side portions of the equipment housing at positions having a distance away from the other end of the equipment housing, so that when an operation force is applied to the other end of the equipment housing toward the charger in the state that the equipment housing is held by the charger, the one end of the equipment housing is pivoted about the engagement projections in such a way to separate from the charger and to produce a moment sufficient to release the engagement of the engagement latch with the engagement hole.

By configuring as described above, when the other end of the equipment housing of the portable electronic equipment is pushed down to remove the portable electronic equipment from the charger, the equipment housing is pivoted about the engagement projections to release the engagement between the engagement hole and the engagement latch, and the one end of the equipment housing is separated from the charger.

In other words, the user need not insert his or her fingers in the space between the portable electronic equipment and the charger to separate the portable electronic equipment but can remove the portable electronic equipment from the charger.

Therefore, the portable electronic equipment of the present invention does not require a space between it and the charger for insertion of the user's fingers, so that the system as a whole with the portable electronic equipment placed in the charger can be made compact as small as possible, and the portable electronic equipment can be removed from the charger with ease.

Another aspect of the present invention is a charger for portable electronic equipment, which has an engagement latch for engagement with and disengagement from an engagement hole formed at one end of an equipment housing of the portable electronic equipment and engagement projections for engagement with engagement recesses of the equipment housing, for recharging the portable electronic equipment in a state that the engagement latch is engaged with the engagement hole and the engagement projections are engaged with the engagement recesses to keep the portable electronic equipment in a held state, wherein: the engagement projections are formed at positions where they engage with the engagement recesses which are formed on side portions of the equipment housing at positions having a distance away from the other end of the equipment housing, so that when an operation force is applied to the other end of the equipment housing toward the charger in the state that the portable electronic equipment is held by the charger, the one end of the equipment housing is pivoted about the engagement projections in such a way to separate from the charger and to produce a moment sufficient to disengage the engagement latch from the engagement hole.

By configuring as described above, when the other end of the equipment housing of the portable electronic equipment is pushed down to remove the portable electronic equipment from the charger, the equipment housing is pivoted about the engagement projections to release the engagement between the engagement hole and the engagement latch, and the other end of the equipment housing is separated from the charger.

In other words, the user need not insert his or her fingers between the portable electronic equipment and the charger to separate the portable electronic equipment but can remove the portable electronic equipment from the charger.

Thus, according to the charger for the portable electronic equipment of the present invention, the system as a whole with the portable electronic equipment placed in the charger can be made compact as small as possible because no space is required between the portable electronic equipment and the charger for insertion of the user's fingers, and the portable electronic equipment can be removed from the charger with ease.

DESCRIPTION OF THE EMBODIMENTS

Embodiments of the present invention will be described in detail with reference to the accompanying drawings.

FIG. 1 to FIG. 5 show one embodiment of a system comprising a folding portable phone as one type of portable electronic equipment and a charger for charging the portable phone, to which the present invention is applied.

Figure 1:
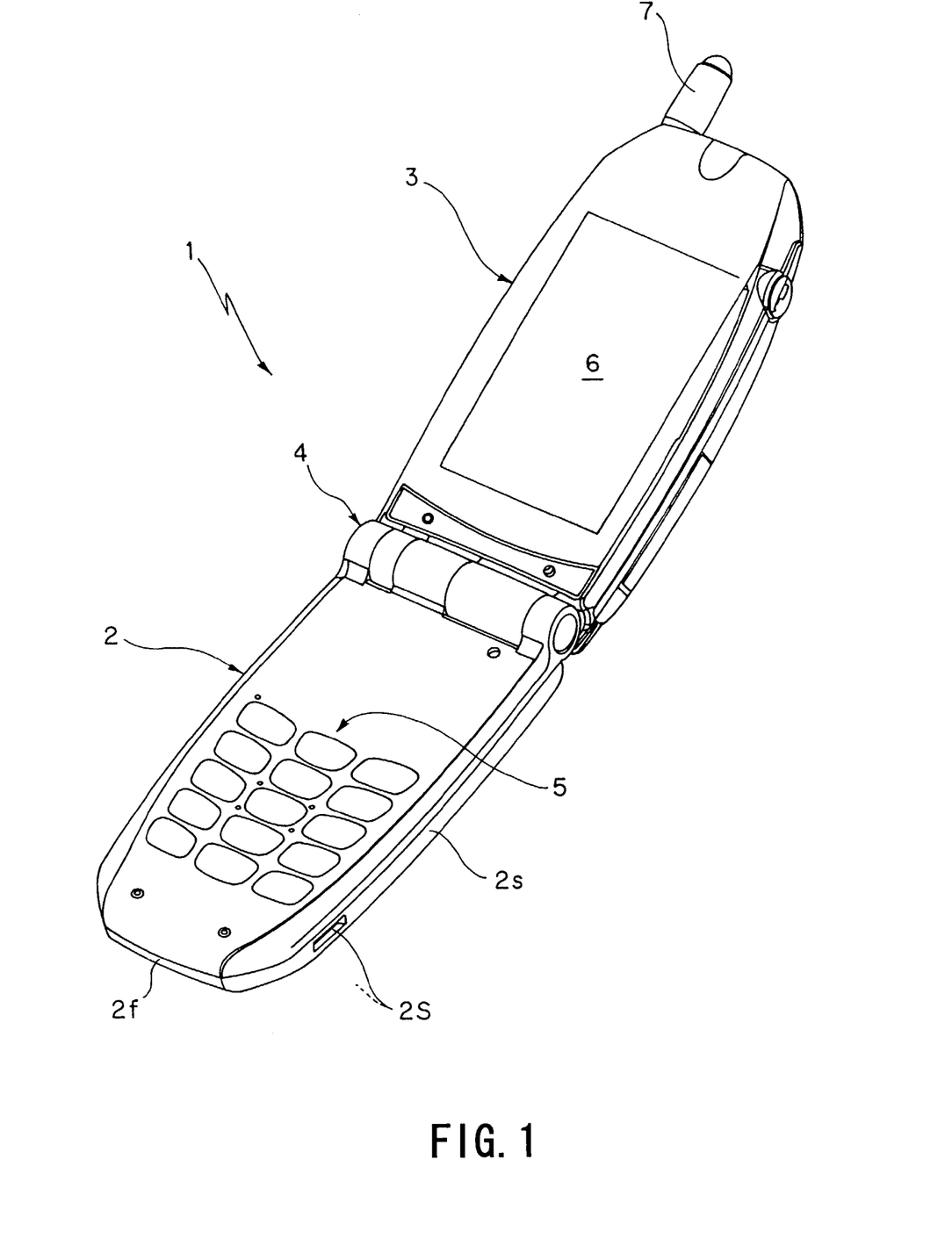
FIG. 1 is an outside perspective view showing an embodiment of portable electronic equipment according to the present invention.
Figure 2A:
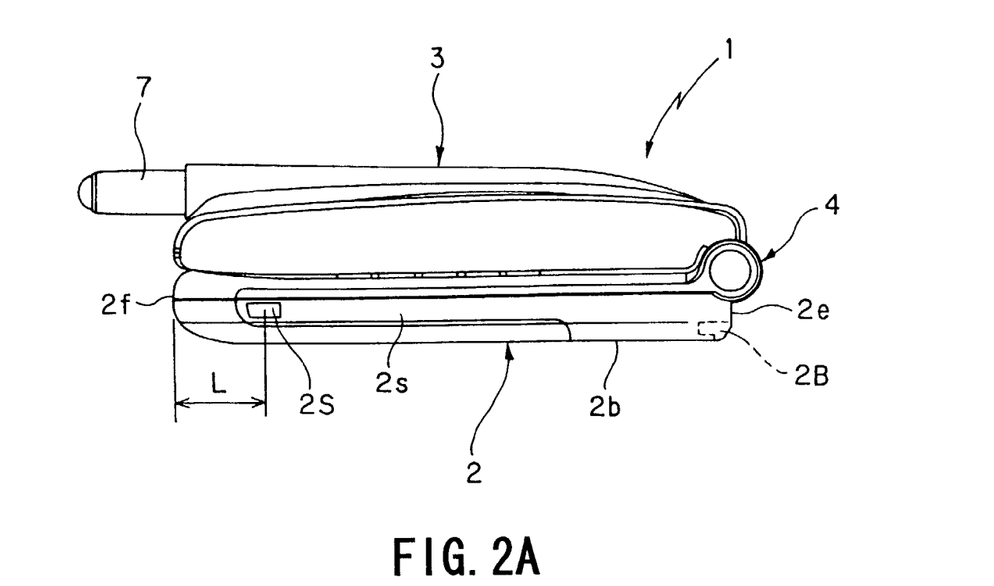
FIG. 2A and FIG. 2B are a side view and a bottom view of the portable electronic equipment shown in FIG. 1.
Figure 2B:
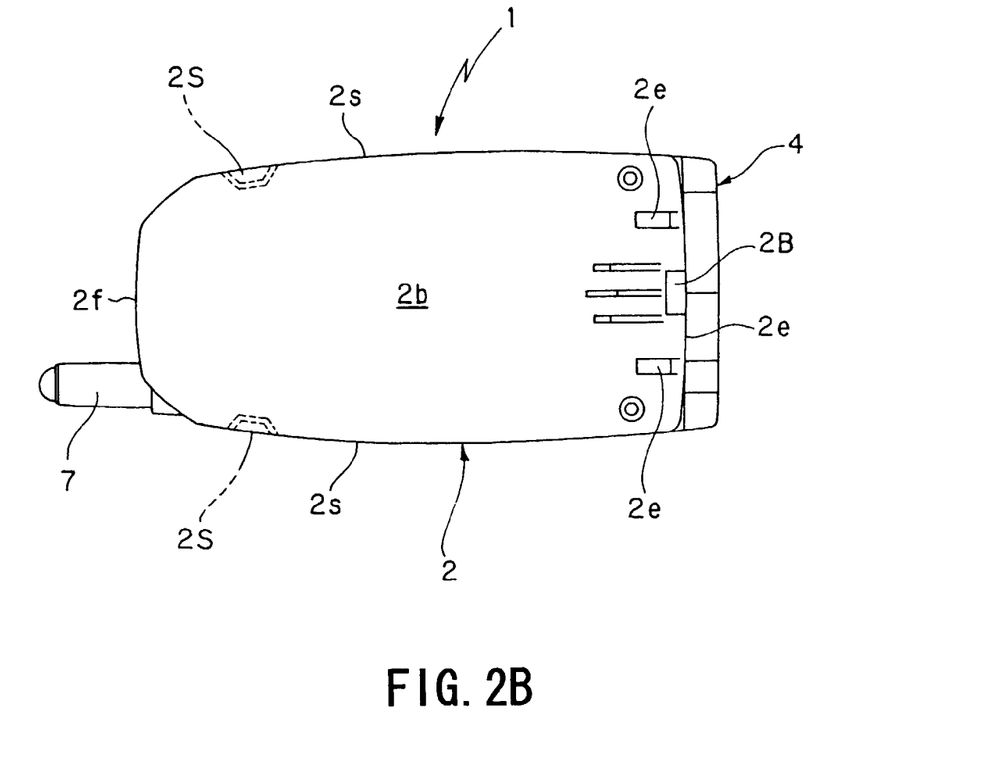

As shown in FIG. 1 and FIGS. 2A and 2B, a portable phone 1 according to this embodiment of the present invention has a lid side housing 3 freely openably connected to a body side housing 2 via a hinge 4. The body side housing 2 is provided with a keypad section 5 and the like on the front (top face), and the lid side housing 3 is provided with a display section 6, an antenna 7 and the like. The portable phone 1 is operated by a rechargeable secondary battery (not shown) mounted in the body side housing 2.

The body side housing 2 of the portable phone 1 has an engagement hole 2B for engagement with an engagement latch of a charger to be described later at its back end (one end) 2e, engagement recesses 2S for engagement with engagement projections of the charger to be described later on right and left side portions 2s, 2s, and a pair of right and left charging terminal blocks 2e, 2e formed on a bottom board 2b.

Here, the respective engagement recesses 2S on the respective side portions 2s of the body side housing 2 are formed a prescribed distance L (about 15 mm in the embodiment), which is determined according to reasons to be described later, away from the front end (the other end) 2f of the body side housing 2.

Figure 3:
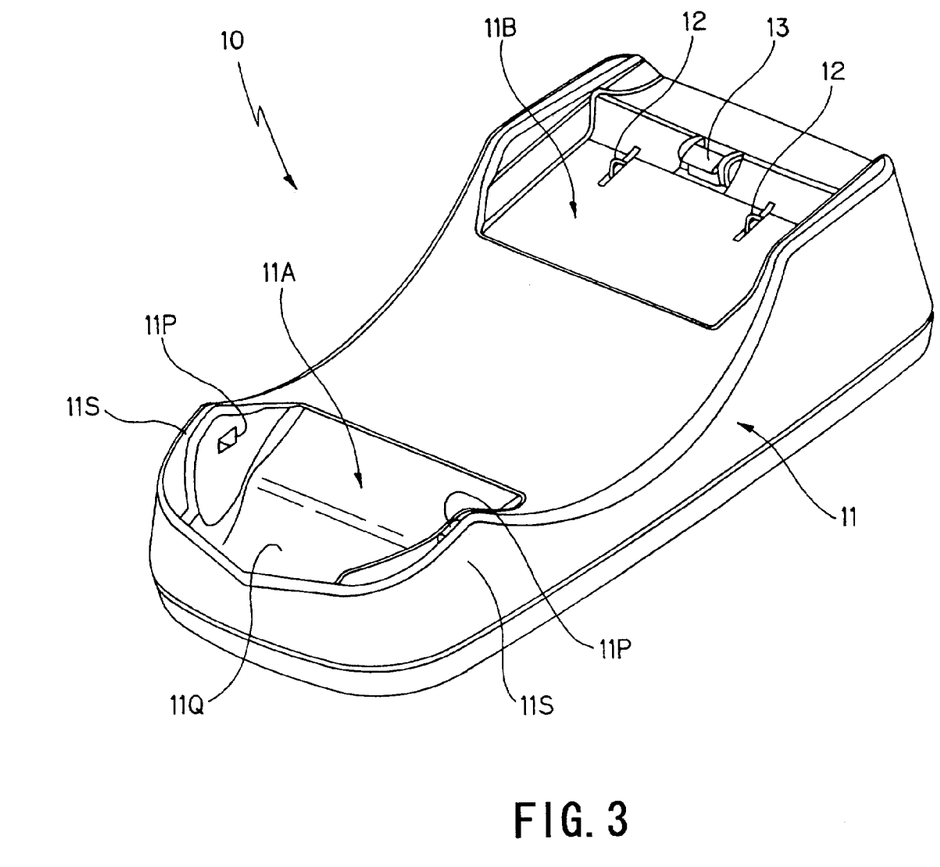
FIG. 3 is an outside perspective view showing an embodiment of a charger for portable electronic equipment according to the present invention.

FIG. 3 shows one embodiment of a charger 10 to be used to recharge the above-described portable phone 1, and a housing 11 of the charger 10 is formed to have a front cradle 11A and a rear cradle 11B in which the portable phone 1 is placed.

Engagement projections 11P are formed on right and left side walls 11S, 11S of the front cradle 11A. These engagement projections 11P are formed at positions so to face the engagement recesses 2S of the portable phone 1 which is placed in and held in position of the charger 10 and to mutually engage with the engagement recesses 2S.

And, the front cradle 11A is formed to have a depressed section 11Q, which is largely scooped downward, in order to avoid interference with the front end of the body side housing 2 when the portable phone 1 is placed in/removed from the charger 10 to be described later.

The rear cradle 11B is formed to have a pair of right and left charging terminals 12, 12 which are contacted with the charging terminal blocks 2e, 2e of the above-described portable phone 1 and an engagement latch 13 for engagement with the engagement hole 2B of the above-described portable phone 1.

Figure 4:
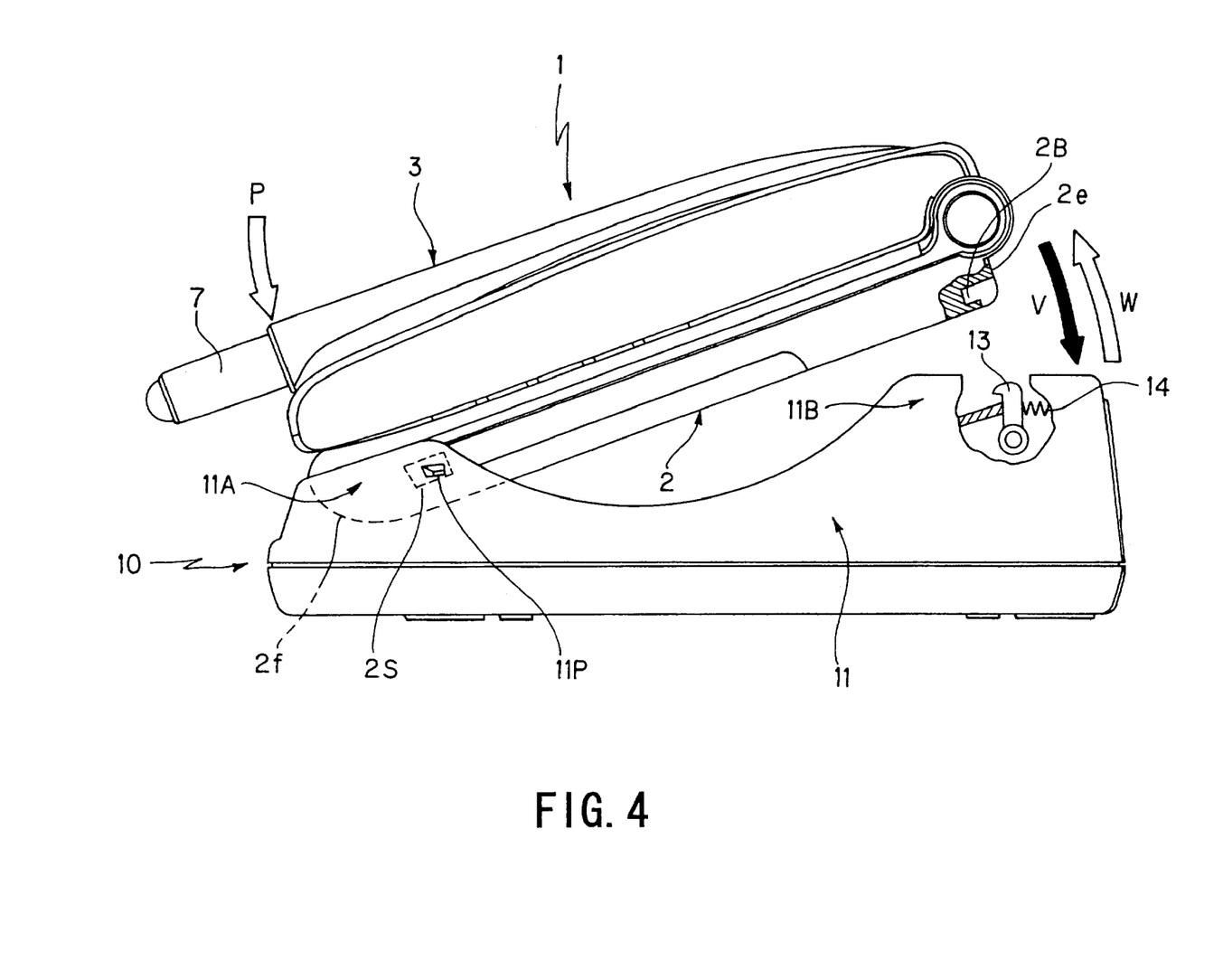
FIG. 4 is a side view showing a state that the portable electronic equipment shown in FIG. 1 is placed in the charger shown in FIG. 3 or taken from the charger shown in FIG. 3.
Figure 5:
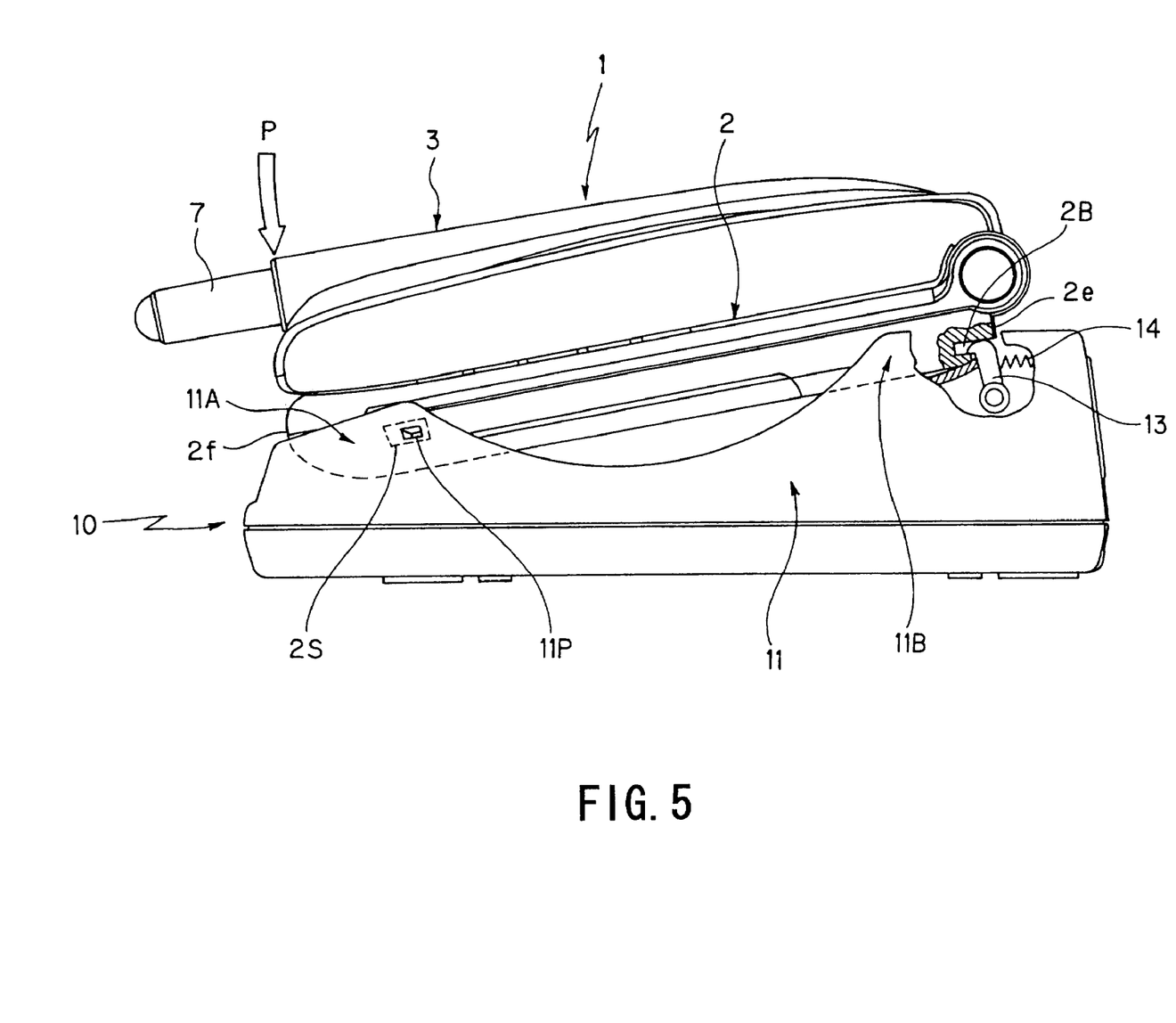
FIG. 5 is a side view showing a state that the portable electronic equipment shown in FIG. 1 is placed in the charger shown in FIG. 3.

The engagement latch 13 is disposed to be freely movable in engaging and disengaging directions with respect to the engagement hole 2B of the portable phone 1, specifically in such a way to appear and disappear with respect to the rear cradle 11B, and kept pushed by a spring 14 in a direction (to the left in the drawing) to protrude to the rear cradle 11B as shown in FIG. 4 and FIG. 5.

To fit the portable phone 1 on the above-described charger 10 in order to recharge the portable phone 1, the engagement recesses 2S of the portable phone 1 are first engaged with the engagement projections 11P of the charger 10 as shown in FIG. 4.

Then, the rear (the right side in the drawing) of the portable phone 1 is pushed down as indicated by arrow V to fit it on the rear cradle 11B against the pushing force of the spring 14 by pushing away the engagement latch 13, and the engagement hole 2B of the portable phone 1 is engaged with the engagement latch 13 as shown in FIG. 5.

Thus, the engagement recesses 2S and the engagement projections 11P are mutually engaged, and the engagement hole 2B and the engagement latch 13 are mutually engaged, so that the portable phone 1 is held in a prescribed position of the charger 10, and the charging terminal blocks 2e, 2e (see FIG. 2) of the portable phone 1 are forced to securely contact with the charging terminals 12, 12 of the charger 10.

Meanwhile, to remove the portable phone 1 from the charger 10 as shown in FIG. 5, a downward force (pushing force) is applied to the front end (other end) 2f of the portable phone 1 toward the charger 10 as indicated by arrow P.

Thus, a moment to move up the rear end (one end) 2e is produced in the portable phone 1 by pivoting about the engagement projections 11P which are in engagement with the engagement recesses 2S.

Here, the engagement recesses 2S of the portable phone 1 are formed at a position a prescribed distance L away from the front end (other end) 2f of the body side housing 2 as described above, specifically in such a way to produce a moment sufficient to release the engagement of the engagement latch 13 with the engagement hole 2B.

Therefore, by applying the downward force (pushing force) as indicated by the arrow P, the rear end (one end) 2e of the portable phone 1 is moved upward as indicated by arrow W in FIG. 4 by pushing away the engagement latch 13 against the pushing force of the spring 14, and the engagement hole 2B of the portable phone 1 is released from the engagement latch 13.

Then, the portable phone 1 is pulled out from the charger 10 to disengage the engagement recesses 2S from the engagement projections 11P to remove the portable phone 1 from the charger 10.

As described above, the portable phone 1 held by the charger 10 can be removed by applying the downward force (pushing force) to the front end (other end) 2f of the portable phone 1 toward the charger 10, in other words, without requiring an operation as if peeling off the portable electronic equipment 1 from the charger 10, so that it is not necessary to provide a space (indicated by mark X in FIG. 12) between the portable phone 1 and the charger 10 for insertion of the user's fingers into it. Thus, the system as a whole in the state that the portable electronic equipment 1 is placed in the charger 10 can be made compact as small as possible.

As described above, the downward force (pushing force) is applied to the front end (other end) 2f of the portable phone 1 toward the charger 10 when the portable phone 1 is removed from the charger 10, so that the charger 10 is pushed against the surface of a desk or the like where the charger 10 is placed. Therefore, it is not necessary to consider if the charger 10 has been fixed or not when removing the portable phone 1 from the charger 10. Thus, workability to remove the portable phone 1 from the charger 10 is made favorable.

Because the depressed section 11Q is formed on the bottom of the front cradle 11A of the charger 10 as described above, the interference with the charger 10 when the portable phone 1 is placed or removed is prevented, and the portable phone 1 can be positioned/removed smoothly.

As the configuration to prevent the interference with the portable phone 1, there are various configurations available, for example, an opening is formed instead of the depressed section 11Q, the front cradle 11A is cut off immediately before the engagement projections 11P, and the like.

Figure 6:
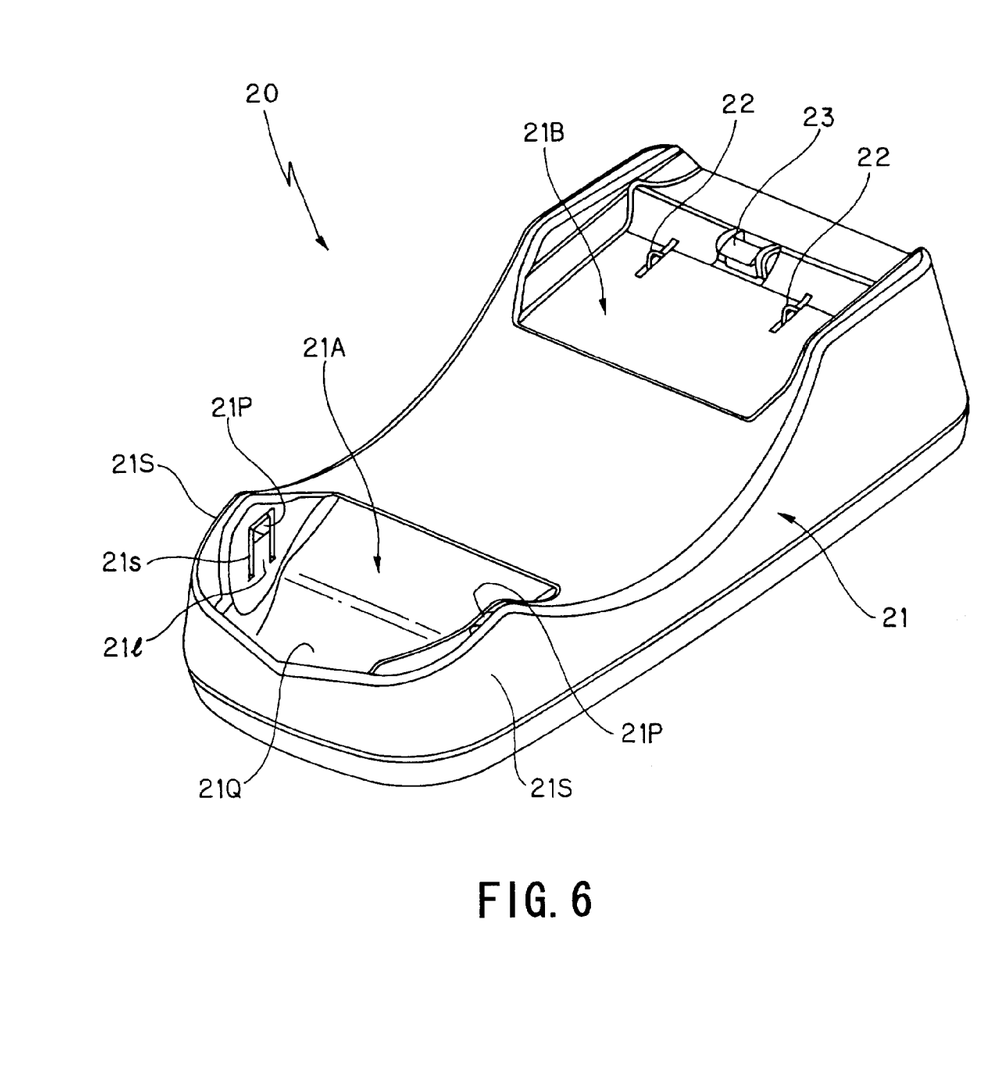
FIG. 6 is an outside perspective view showing another embodiment of the charger for the portable electronic equipment according to the present invention.

FIG. 6 shows another embodiment of the charger which is used to recharge the portable phone 1 shown in FIG. 1 and FIG. 2. An inverted U-shaped slit 21s which surrounds an engagement projection 21P is formed on side walls 21S, 21S of a front cradle 21A of a charger 20.

The slit 21s forms a resilient tongue 21l which has the engagement projection 21P at one end (top end), the resilient tongue 21l allows the engagement projection 21P to move in appearing and disappearing directions with respect to the side wall 21S of the front cradle 21A.

Here, the above-described charger 20 has basically the same configuration as that of the charger 10 shown in FIG. 3 to FIG. 5 excepting that the resilient tongue 21l is formed by the slit 21s. Therefore, the structure elements of the charger 20 which have the same functions as those of the charger 10 are allotted the numbers 20s by adding 10 to the same reference numerals in FIG. 6 indicating the same elements shown in FIG. 3 to FIG. 5, and their detailed description is omitted.

With the charger 20 configured as described above, the portable phone 1 is placed/removed in the same way as the charger 10 described above. Thus, the system as a whole with the portable electronic equipment 1 placed in the charger 20 can be made compact as small as possible, and the portable phone 1 can be removed from the charger 20 smoothly.

Figure 7:
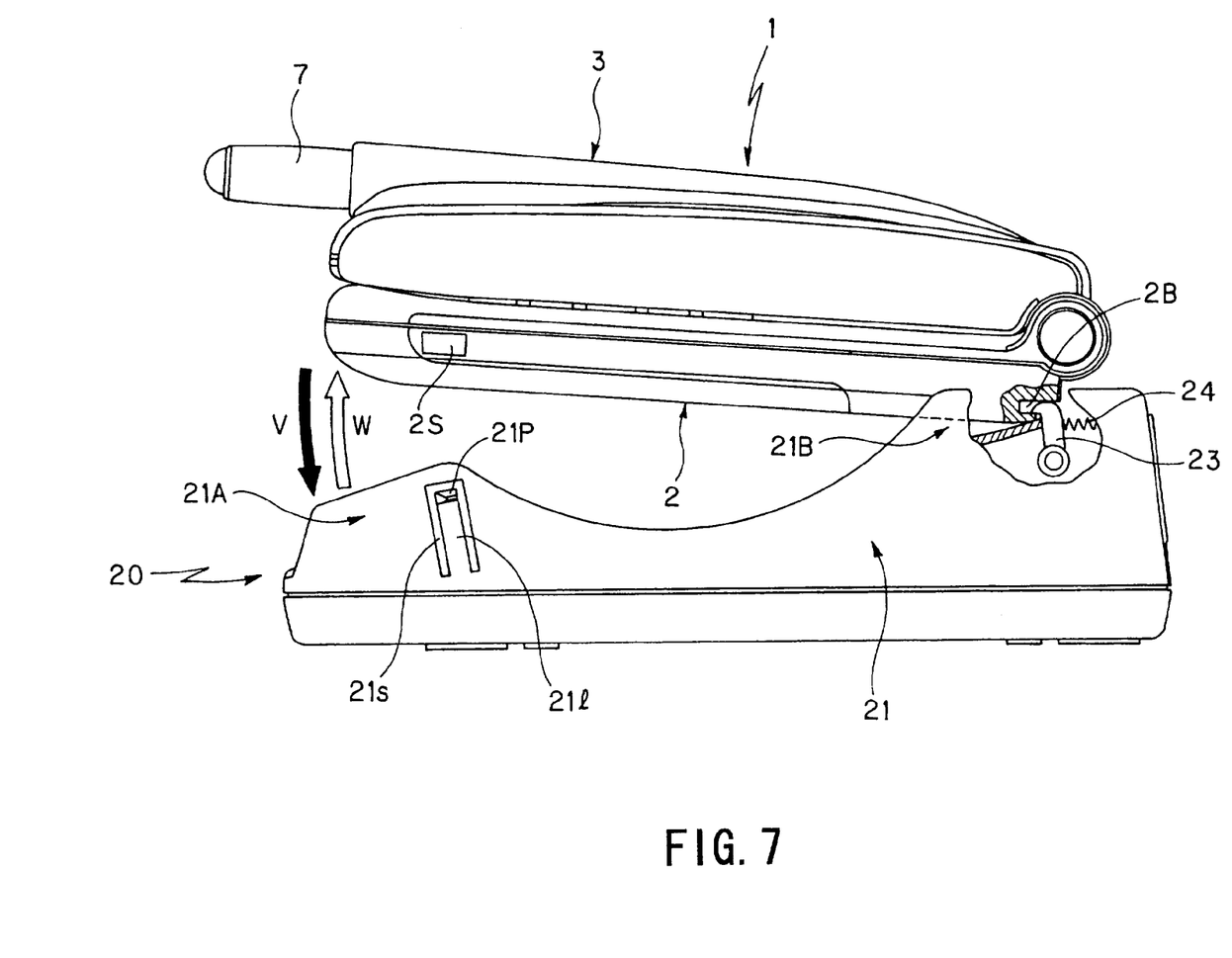
FIG. 7 is a side view showing a state that the portable electronic equipment shown in FIG. 1 is placed in the charger shown in FIG. 6 or taken from the charger shown in FIG. 6.

With the charger 20 configured as described above, the engagement hole 2B of the portable phone 1 is engaged with an engagement latch 23 of the charger 20 as shown in FIG. 7, the front (the left side in the drawing) of the portable phone 1 is pushed down as indicated by arrow V so to engage the engagement projections 21P with the engagement recesses 2S. Thus, the portable phone 1 can be placed in the charger 20.

Besides, the portable phone 1 can be removed from the charger 20 by pulling up as indicated by arrow W the front (the left side in the drawing) of the portable phone 1 which is placed in the charger 20 to disengage the engagement recesses 2S from the engagement projections 21P and pulling out the engagement hole 2B of the portable phone 1 from the engagement latch 23 of the charger 20.

Thus, to fit/remove the portable phone 1 to/from the charger 20 configured as described above, the order of the engagement of the engagement latch 23 and the engagement hole 2B and the engagement of the engagement projections 21P and the engagement recesses 2P is not limited. Therefore, workability to mount/remove the portable phone 1 can be made more comfortable.

In the respective embodiments described above, the folding portable phone as one embodiment of the portable electronic equipment and the charger for charging the folding portable phone were exemplified, but it is to be noted that the present invention can be applied effectively to a typical type of portable phone and charger.

Besides, in the respective embodiments described above, examples of applying the present invention to the rechargeable portable electronic equipment, namely a portable phone, and a charger for the portable phone were described. But, it is to be noted that the present invention can be effectively applied to various types of portable electronic equipment, such as PDAs (personal data assistants), other than the portable phones, chargers, and the like,.

What is claimed is:

1. Portable electronic equipment which has an engagement hole to be engaged with and disengaged from an engagement latch of a charger at one end of an equipment housing and has engagement recesses in the equipment housing for engagement with engagement projections of the charger, and which is charged by the charger in a state that the portable electronic equipment is held by the charger with the engagement latch engaged with the engagement hole and the engagement projections engaged with the engagement recesses, wherein: the engagement recesses are formed on side portions of the equipment housing at positions having a distance away from the other end of the equipment housing, so that when an operation force is applied to the other end of the equipment housing toward the charger in the state that the equipment housing is held by the charger, the one end of the equipment housing is pivoted about the engagement projections in such a way to separate from the charger and to produce a moment sufficient to release the engagement of the engagement latch with the engagement hole.

2. A charger for portable electronic equipment, which has a engagement latch for engagement with and disengagement from an engagement hole formed at one end of an equipment housing of the portable electronic equipment and engagement projections for engagement with engagement recesses of the equipment housing, for recharging the portable electronic equipment in a state that the engagement latch is engaged with the engagement hole and the engagement projections are engaged with the engagement recesses to keep the portable electronic equipment in a held state, wherein: the engagement projections are formed at positions where they engage with the engagement recesses which are formed on side portions of the equipment housing at positions having a distance away from the other end of the equipment housing, so that when an operation force is applied to the other end of the equipment housing toward the charger in the state that the portable electronic equipment is held by the charger, the one end of the equipment housing is pivoted about the engagement projections in such a way to separate from the charger and to produce a moment sufficient to disengage the engagement latch from the engagement hole.

3. A charger for portable electronic equipment comprising:

at least one engagement latch that engages with and disengages from at least one engagement hole formed at one end of an equipment housing of said portable electronic equipment; and at least one engagement projection that engages with engagement recesses of the equipment housing where projections are engaged with the engagement recesses to keep the portable electronic equipment in a held state, wherein the at least one engagement projection is formed at a position where it engages with the engagement recesses which are formed on side portions of the equipment housing at positions having a distance away from the other end of the equipment housing, so that when an operation force is applied to the other end of the equipment housing, the one end of the equipment housing is pivoted about said at least one engagement projection in such a way to separate from the charger and to produce a moment sufficient to disengage the at least one engagement latch from the at least one engagement hole.

* * * * *